(12) United States Patent
De Rossi et al.

(10) Patent No.: US 9,026,408 B2
(45) Date of Patent: May 5, 2015

(54) METHOD FOR CALCULATING A SYSTEM, FOR EXAMPLE AN OPTICAL SYSTEM

(75) Inventors: Hélène De Rossi, Charenton le Pont (FR); Fabien Muradore, Charenton le Pont (FR)

(73) Assignee: Essilor International (Compagnie Generale D'Optique), Charenton-le-Pont ( * ) Notice: Subject to any disclaimer, the term of this patent is extended or adjusted under 35 U.S.C. 154(b) by 617 days.

(21) Appl. No.: 13/143,051

(22) PCT Filed: Dec. 24, 2009

(86) PCT No.: PCT/EP2009/067924
§ 371 (c)(1),
(2), (4) Date: Jun. 30, 2011

(87) PCT Pub. No.: WO2010/076294
PCT Pub. Date: Jul. 8, 2010

(65) Prior Publication Data
US 2012/0016644 A1 Jan. 19, 2012

(30) Foreign Application Priority Data
Dec. 31, 2008 (EP) .................................... 08306028

(51) Int. Cl.
*G06F 7/60* (2006.01)
*G06F 17/10* (2006.01)
(Continued)

(52) U.S. Cl.
CPC ............ *G06F 17/50* (2013.01); *G06F 2217/16* (2013.01); *G02C 7/02* (2013.01); *G02C 7/028* (2013.01)

(58) Field of Classification Search
CPC . G06F 17/50; G06F 17/5018; G06F 17/5036; G06F 17/5004; G06F 17/5009; G06F 2217/16; G02C 7/02; G02C 7/028

USPC .............................. 703/2, 5; 702/19; 351/177
See application file for complete search history.

(56) References Cited

U.S. PATENT DOCUMENTS

| | | | |
|---|---|---|---|
| 2001/0050752 A1* | 12/2001 | Shirayanagi | 351/177 |
| 2003/0090623 A1* | 5/2003 | Rubinstein et al. | 351/177 |
| 2003/0107706 A1* | 6/2003 | Rubinstein et al. | 351/177 |

FOREIGN PATENT DOCUMENTS

| | | |
|---|---|---|
| CN | 101226606 | 7/2008 |
| DE | 10122707 A1 | 11/2001 |

(Continued)

OTHER PUBLICATIONS

Grant, Eric, "Constraint-Based Design by Cost Function Optimization", 1991, Department of Computer Science, University of North Carolina at Chapel Hill.*

(Continued)

*Primary Examiner* — Aniss Chad
*Assistant Examiner* — Cedric D Johnson
(74) *Attorney, Agent, or Firm* — Polsinelli PC

(57) ABSTRACT

A method for calculating a system by optimization, the method comprising the steps of: i. providing a set of system parameters so as to define a starting system, each system parameter being set up at a starting value; ii. defining a plurality of criteria; iii. associating for each criterion a cost function; iv. defining a plurality of global cost functions by associating to each global cost function at least one cost function; v. defining a vector of variable parameters associated to each global cost function by selecting for each vector of variable parameters at least one system parameter; vi. optimizing the plurality of global cost functions by modifying the values of the system parameters of the vectors of variable parameters so as to obtain an intermediate system; repeating step vi. until an equilibrium is reached so as to obtain a system.

17 Claims, 10 Drawing Sheets

(51) Int. Cl.
*G06F 17/50* (2006.01)
*G02C 7/02* (2006.01)

(56) References Cited

FOREIGN PATENT DOCUMENTS

| EP | 1262815 A | 12/2002 |
| EP | 1262815 A2 * | 12/2002 |
| WO | WO 00/52517 A | 9/2000 |
| WO | WO 02/088830 A | 11/2002 |
| WO | WO 2008/089999 A | 7/2008 |

OTHER PUBLICATIONS

Dobrowolski, J.A. et al., "Refinement of Optial Multilayer Systems with Different Optimization Procedures", Jul. 1, 1990, Optical Society of America.*

International Search Report, PCT/EP2009/067924, dated Feb. 16, 2010, 6 pages.
Notice of Granting Patent Right for Invention based on the provided Claims, Chinese counter-application No. CN200980156801.4, Issued Jan. 28, 2014; 6 pages.
Basar, T. et al. "Chapter 4: Static Noncooperative Infinite Games." *Dynamic Non-Cooperative Game Theory*, SIAM, 1999, pp. 161-186.
Cohen, G. et al. "Numberical Algorithms for Nash Equilibria." *Auto-Manufacturing Industrial Computing*, vol. 2, No. 3, 1986.
Nash, J. "Non-Cooperative Games." *The Annals of Mathematics*, Second Series, vol. 54, No. 2, Sep. 1951, pp. 286-295.
Periaux, J. et al. "MOO Methods for Multidisciplinary Design Using Parallel Evolutionary Algorithms, Game Theory and Hierarchical Topology: Theoretical Aspects (Part 1)." *VKI Lecture Series on Introduction to Optimization and Multidisciplinary Design in Aeronautics and Turbomachinery*, May 7-11, 2012.

* cited by examiner

METHOD FOR CALCULATING A SYSTEM, FOR EXAMPLE AN OPTICAL SYSTEM

CROSS-REFERENCES TO RELATED APPLICATIONS

This application is a national stage filing based upon international application no. PCT/EP2009/067924, filed 24 Dec. 2009 and published on 8 Jul. 2010 under international publication no. WO 2010/076294 (the '924 application), which claims priority to European application no. 08306028.5, filed 31 Dec. 2008 (the '28.5 application). The '924 application and '28.5 application are both hereby incorporated by reference as though fully set forth herein.

FIELD OF THE INVENTION

The invention relates to a method for calculating a system, as for example an optical system by optimization. The invention further relates to a method of manufacturing a system, as for example an optical system, a computer program product and computer-readable medium.

BACKGROUND

Optimization methods for systems calculation, such as for optical systems, are known from the state of the art. However, currently the number of criteria taken into account is limited and do not enable to answer all system designer's needs. In the field of optical systems, French patent FR 9812109 of the Applicant describes an example of a "classical" method for determining optimal parameters of an optical system according especially to astigmatism and power criteria.

Furthermore, in the field of ophthalmic optics, known "classical" methods are usually developed so as a set of selected criteria may reach or approach target values. Said target values are predetermined by the optical system designer. "Classical" constraints, such as for example local thickness, are taken into account during the optimization namely in order to meet aesthetics and manufacturing requirements. As a result, "classical" methods limit the potential optical systems that could answer the lens wearer needs.

SUMMARY

The present invention improves the situation and makes it possible to avoid those drawbacks.

In accordance with one aspect of the invention, there is provided a method implemented by computer means for calculating a system (S) by optimization, the method comprising the steps of:
i. providing a set of system parameters (SP) so as to define a starting system (SS), each system parameter (SP) being set up at a starting value;
ii. defining a plurality of criteria ($C_k$);
iii. associating for each criterion ($C_k$) a cost function ($CF_k$);
iv. defining a plurality of global cost functions ($GCF_1, \ldots, GCF_{ND}$) by associating to each global cost function ($GCF_p$) at least one cost function ($CF_k$);
v. defining a vector of variable parameters ($X_p$) associated to each global cost function ($GCF_p$) by selecting for each vector of variable parameters ($X_p$) at least one system parameter (SP);
vi. optimizing the plurality of global cost functions ($GCF_1, \ldots, GCF_{ND}$) by modifying the values of the system parameters of the vectors of variable parameters ($X_1 \ldots, X_{ND}$) so as to obtain an intermediate system (IS);
vii. repeating step vi) until an equilibrium is reached so as to obtain a system (S).

System parameters are parameters suitable to define the system to be optimized and obtain information that make possible to manufacture said system.

The equilibrium can be, for example, Nash equilibrium, Stackelberg equilibrium or any other well known equilibrium. Nash equilibrium are described, for example, in "Non-cooperative games", John Nash, 1951, and also in "MOO methods for multidisciplinary Design Using Parallel Evolutionary Algorithms, Game Theory and Hierarchical Theory Theoretical Background", Periaux et al., in *VKI lectures series: Introduction to Optimization and Multidisciplinary Design*, Rhode-Saint-Genese, Belgium. Stackelberg equilibrium is described, for example, in T. Basar and G. J. Olsder. "Dynamic Non-cooperative Game Theory", *SIAM*, 1999.

In the sense of the invention, "optimizing" shall preferably be understood as "minimizing" a real function. Of course, the skilled in the art will understand that the invention is not limited to a minimization per se. The optimization could also be a maximization of a real function. Namely "maximizing" a real function is equivalent to "minimizing" its opposite.

Thanks to the present invention, one can optimize advantageously systems by separating a complex optimization problem into several smaller optimization problems which are simpler to solve. Optimization can be made with fewer compromises between criteria.

Moreover, by implementing the method according to the invention, a larger number of criteria can be taken into account while simplifying the optimization problem.

According to another advantage of the method according to the invention, some criteria which are taken into account in the cost functions can be defined with or without targets. Each criterion can be therefore more efficiently optimized. As a result, the optimization method according to the invention is less complex, less time consuming and more flexible.

According to en embodiment of the present invention, during step vi), optimizing the plurality of global cost functions ($GCF_1, \ldots, GCF_{ND}$) is effected by using a multi-criteria method.

An example of multi-criteria method is described, for example, in <<Algorithmes numériques pour les équilibres de Nash>>, COHEN G.; CHAPLAIS F., Automatique-productique informatique industrielle, 1986. Using a multi-criteria method allows the simultaneous optimization of a set of global cost functions until equilibrium is reached.

According to another embodiment of the present invention, during step vi), optimizing the plurality of global cost functions ($GCF_1, \ldots, GCF_{ND}$) is effected by using a multi-objective method.

Multi-objective optimization is the problem of finding a vector of decision variables which satisfies constraints and optimises a vector function whose elements represent the objective functions. These functions form a mathematical description of performance criteria which are usually in conflict with each other. Hence the term optimize means finding such a solution which would give the values of all the objective functions acceptable for the designer", Coello, 2000.

According to an embodiment of the present invention, during step v), the at least one system parameter is selected for only one vector of variable parameter ($X_p$).

According to an embodiment of the present invention,
the system (S) is an optical system (OS);
the system parameters (SP) are optical system parameters (OSP);

the starting system (SS) is a starting optical system (SOS), each optical system parameter being set up at a starting value.

An optimization method is a process even more complex when a large number of criteria has to be taken into account by the optical designer. Thanks to the invention, a plurality of global cost functions can be defined. Each global cost function can advantageously gather criteria of the same type. It can be, for example, criteria of geometrical or of optical type. The optimization method can be therefore separated into several smaller optimization problems which are simpler to solve. For each global cost function, a vector of variable parameters can be defined by selecting at least one optical system parameter. Only those selected optical system parameters will be allowed to vary during the optimization process. As a result, the various global cost functions can be optimized separately but altogether until equilibrium is reached.

As previously mentioned, one can avoid using targets thanks to the present invention. Indeed, for some criteria, which are different from classical criteria, the utilization of targets turns out to be less efficient. This way to proceed limits the number of potential solutions when the optical designer wants to optimize, for example, the magnification of the optical system. Determining target values can be also time consuming.

According to an embodiment the method for calculating by optimization, an optical system of the invention can advantageously take into account wearers data like for example but not limited to pantoscopic angle, wrap angle, lens-eye distance.

According to an embodiment where the system (S) is an optical system (OS), the starting optical system (SOS) comprises a first and a second optical surface, and during step v), a first and a second vector of variable parameters ($X_1, X_2$) are defined, the first vector of variable parameters ($X_1$) comprising optical system parameters related to the first optical surface, the second vector of variable parameters ($X_2$) comprising optical system parameters related to the second optical surface.

According to embodiments of the present invention that may be combined:
- at least one global cost function ($GCF_p$) is defined by associating only one or several cost function(s) ($CF_k$) associated to optical criteria ($C_k$) selected in the list consisting of power in central vision, astigmatism in central vision, high order aberration in central vision, acuity in central vision, power in peripheral vision, astigmatism in peripheral vision, high order aberration in peripheral vision, or a variation of preceding criteria;
- at least one global cost function ($GCF_p$) is defined by associating only one or several cost function(s) ($CF_k$) associated to optical criteria ($C_k$) selected in the list consisting of prismatic deviation in central vision, ocular deviation, object visual field in central vision, image visual field in central vision, magnification in central vision pupil field ray deviation, object visual field in peripheral vision, image visual field in peripheral vision, prismatic deviation in peripheral vision, magnification in peripheral vision, magnification of the eye, temple shift or a variation of preceding criteria;
- at least one global cost function ($GCF_p$) is defined by associating only one or several cost function(s) ($CF_k$) associated to a geometrical criteria ($C_k$).

According to an embodiment of the present invention, during step vi) and step vii), each of the plurality of global cost functions ($GCF_p$) are optimized until an equilibrium is reached.

The invention also relates to a method of manufacturing a system (S), the method comprising:
calculating the system (S) by optimization and manufacturing the calculated system.

According to preceding embodiment, the system (S) to be manufactured is an optical system (OS), and the method comprises:
calculating the optical system (OS) by optimization and manufacturing the calculated optical system.

The invention also relates to a computer program product comprising one or more stored sequences of instructions that are accessible to a processor and which, when executed by the processor, cause the processor to carry out the steps of preceding embodiments.

The invention also relates to a computer-readable medium carrying one or more sequences of instructions of the computer program product of the preceding embodiment.

Unless specifically stated otherwise, as apparent from the following discussions, it is appreciated that throughout the specification discussions utilizing terms such as "computing", "calculating" "generating", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations therein. This apparatus may be specially constructed for the desired purposes, or it may comprise a general purpose computer or Digital Signal Processor ("DSP") selectively activated or reconfigured by a computer program stored in the computer. Such a computer program may be stored in a computer readable storage medium, such as, but is not limited to, any type of disk including floppy disks, optical disks, CDROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

In the frame of the present invention, the optical system can be, for example but not limited to, an ophthalmic lens comprising a first and a second surface. The first and/or the second surface can be a progressive addition surface, a spherical surface, an aspherical surface, a toric surface or an atoric surface.

In the scope of the present invention, the aforementioned terms are understood according to the following definitions:
an "optical system" (OS) is defined by all its surfaces, mainly by the coefficients of the equations of said surfaces, the index of the glasses and the position of each surface relatively to each other (offset, rotation and tilt). These elements are referred to the optical system parameters (OSP) of the optical system (OS) Surfaces of an optical system are usually represented according to a polynomial or parametric equation obtained by using a model based on the B-splines or Zernike polynomials. These models give continuous curvature on the whole lens. Surfaces can also be Fresnel or pixelized surfaces. A surface can be a function of several surfaces (for example, the function can be a weighted sum). The index of materials can be inhomogeneous and may depend on some parameters of the optical system (OS);

an "optical criterion" is defined as a criterion that has an impact on the visual performance of a wearer and/or of an observer of the wearer. Optical criteria are classified into three groups:

central vision optical criteria (CVOC) group comprising: power in central vision, astigmatism in central vision, high order aberration in central vision, acuity in central vision, prismatic deviation in central vision, ocular deviation, object visual field in central vision, image visual field in central vision, magnification in central vision or a variation of preceding criteria;

peripheral vision optical criteria (PVOC) group comprising: power in peripheral vision, astigmatism in peripheral vision, high order aberration in peripheral vision, pupil field ray deviation, object visual field in peripheral vision, image visual field in peripheral vision, prismatic deviation in peripheral vision, magnification in peripheral vision, or a variation of preceding criteria;

global optical criteria (GOC) group comprising:

magnification of the eye, temple shift.

In the scope of the present invention, a "geometrical criterion" refers to a criterion that affects a physical characteristic of the optical system (OS) Geometrical criteria comprise, for example but not limited to, thickness which is a local geometrical criterion and volume which is a global geometrical criterion.

According to the present invention, a "local criterion" shall mean that the criterion is evaluated on an evaluation domain defined with at least a gaze direction or peripheral ray direction. In particular, the above mentioned central vision optical criteria (CVOC) and peripheral vision optical criteria (PVOC) are local criteria.

According to the present invention, a "global criterion" shall mean that the global criterion is evaluated taking into account the optical system (OS) as a whole.

In the scope of the present invention, the other aforementioned terms are understood according to the following definitions:

"central vision" (also referred as "foveal vision") describes the work of the fovea, a small area in the center of the retina that contains a rich collection of cones. In a central vision situation, an observer looks at an object which stays in a gaze direction and the fovea of the observer is moved to follow the object. Central vision permits a person to read, drive, and perform other activities that require fine and sharp vision;

a "gaze direction" is defined by two angles measured with regard to reference axes centered on the center of rotation of the eye;

"peripheral vision" describes the ability to see objects and movement outside of the direct line of vision. In a peripheral vision situation, an observer looks in a fixed gaze direction and an object is seen out of this direct line of vision. The direction of a ray coming from the object to the eye is then different from the gaze direction and is referred as peripheral ray direction. Peripheral vision is mainly the work of the rods, photoreceptor cells located outside the fovea of the retina;

a "peripheral ray direction" is defined by two angles measured with regard to reference axes centered on the eye entrance pupil and moving along the gaze direction axis;

"power criterion in central vision" means that the power prescribed to the wearer is taken into account. During the optimization, parameters of the optical system are calculated in order to minimize power errors for each gaze direction;

"astigmatism criterion in central vision" means that during the optimization, parameters of the optical system are calculated in order to minimize the difference between astigmatism prescribed to the wearer and astigmatism generated by the intermediate optical system both as regards amplitude and the axis thereof in the reference axes associated to the CRE and for each gaze direction, this difference being called residual astigmatism;

"higher-order aberrations in central vision" describe aberrations that modify the blurredness of the image of the object observed by the wearer in central vision besides the commonly residual power and residual astigmatism, for example, spherical aberration and coma. The orders by which aberrations are referred to are generally orders expressed by Zernike polynomial representation;

"peripheral power" is defined as the power generated by the optical system when the wearer observes an object in peripheral vision;

"peripheral astigmatism" is defined as the astigmatism generated by the optical system both as regards amplitude and the axis;

"ocular deviation" is defined in central vision and describes the fact that adding a lens causes an eye to rotate in order to stay focused on the same object. The angle can be measured in prismatic diopters;

"object visual field in central vision" is defined in the object space by the portion of space that the eye can observe scanning an angular portion of the lens determined by at least two gaze directions. For instance, these gaze directions can be defined by the shape of the spectacle frame or by an aberration level that hinders visualizing the object space with a good enough sharpness;

"image visual field in central vision in the image space" is defined for a determined and fixed object visual field in central vision in the object space (eye space), as the angular portion scanned by the eye to visualize the visual field in the object space;

"higher-order aberrations in peripheral vision" describe aberrations that modify the blurredness of the image of the object observed by the wearer in peripheral vision besides the commonly residual peripheral power and residual peripheral astigmatism, for example, peripheral spherical aberration and peripheral coma. The orders by which aberrations are referred to are generally orders expressed by Zernike polynomial representation;

"pupil field ray deviation" describes that a ray coming from an object located in the peripheral field of view is modified by adding a lens on its path to the eye entrance pupil;

"object visual field in peripheral vision" is defined in the object space. It is the portion of space that the eye can observe in the peripheral visual field of view (while the eye is looking in a fixed direction) defined by at least two rays issued from the center of eye entrance pupil. For instance, these rays can be defined by the shape of the spectacle frame or by an aberration level that hinders visualizing the object space with a good enough sharpness;

"image visual field in peripheral vision" is defined for a determined and fixed peripheral object visual field as the corresponding angular portion in the image space viewed by the peripheral vision of the eye;

"prismatic deviation in central vision" is defined in the object space by the angular deviation of a ray issued from the center of rotation of the eye introduced by the quantity of prism of the lens;

"prismatic deviation in peripheral vision" is the angular deviation of a ray issued from the center of the entrance pupil introduced by the quantity of prism of the lens;

"magnification in central/peripheral vision" is defined as the ratio between the apparent angular size (or the solid angle) of an object seen in central/peripheral vision without lens and the apparent angular size (or the solid angle) of an object seen through the lens in central/peripheral vision;

"magnification of the eye" is defined as the magnification of the eye of the wearer assessed by an observer;

"temple shift" is defined as the offset of the wearer temple assessed by an observer;

"lens volume" is the volume of the lens. It can be assessed through discretization of the lens, for example by a trapezium method or by a rectangle method;

an "evaluation zone" is associated with a local criterion to be evaluated; it is composed of one or several evaluation domains. An evaluation domain is composed of one or several gaze directions for a criterion belonging to the central vision optical criteria (CVOC) group or to the geometrical local criteria group and of one or several peripheral ray directions for a criterion belonging to the peripheral vision optical criteria group (PVOC);

a "target value" is a value to be reached by a criterion. When the selected criterion is a local criterion, a target value is associated to an evaluation domain. When the selected criterion is a global criterion, a target value is associated to the whole optical system (OS);

a "stop criterion" is used to find the iteration to stop the optimization algorithm; it is said that the system has reached an "equilibrium";

a "cost function" is a real function which is used for the calculation of a global cost function (GCF);

a "global cost function" (GCF) is defined as a function of at least one cost function and provides a level of performance of the intermediate optical system (IOS);

a "discipline" is set of criteria for which the same vector of variable parameters is defined;

an "equilibrium" is a state in which the system considered cannot be further optimized in a certain way. Examples of equilibrium are Nash equilibrium and Stackelberg equilibrium.

BRIEF DESCRIPTIONS OF THE DRAWINGS

FIGS. 1a and b show diagrammatic views of the steps of method for calculating an optical system (OS) according to embodiments of the present invention;

Figure 16A:
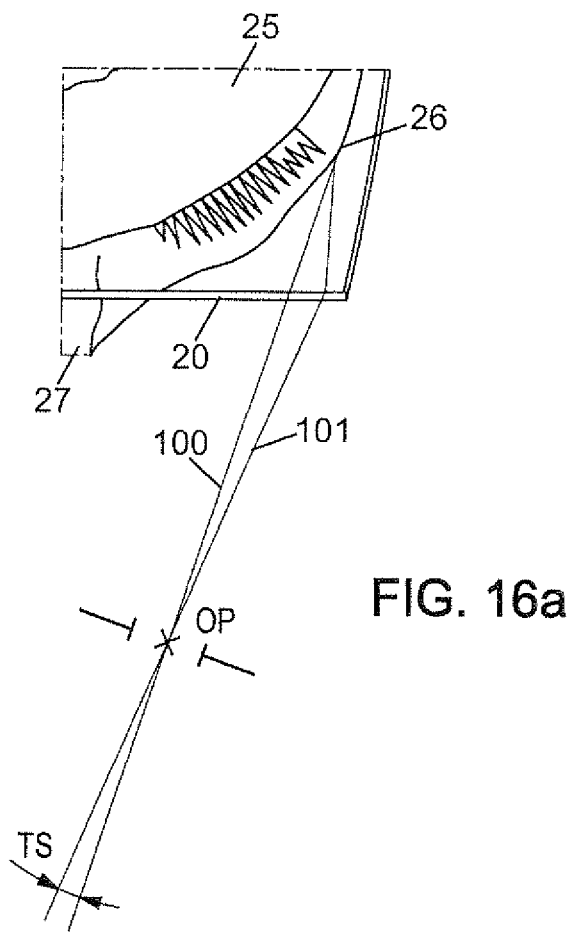
Figure 16B:
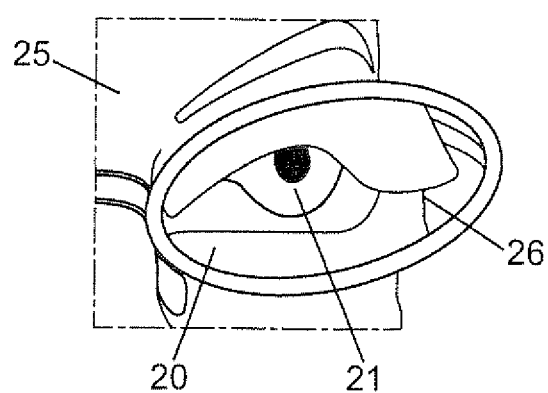

FIGS. 16a and b illustrate temple shift.

Skilled artisans appreciate that elements in the figures are illustrated for simplicity and clarity and have not necessarily been drawn to scale. For example, the dimensions of some of the elements in the figures may be exaggerated relative to other elements to help improve the understanding of the embodiments of the present invention. Same reference on different figures refers to the same object.

DETAILED DESCRIPTIONS

Figure 1A:
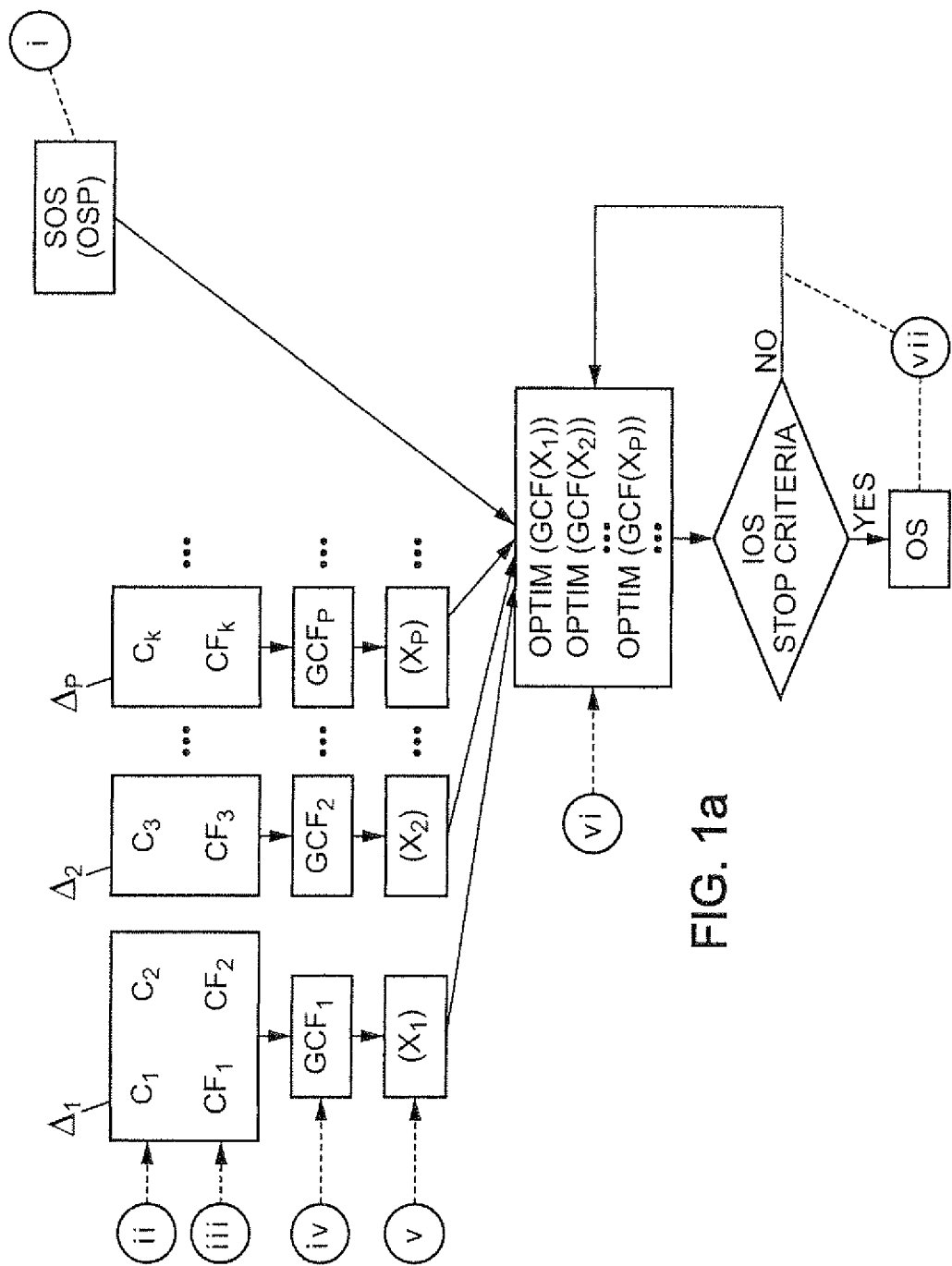

With reference to FIG. 1a, a method for calculating an optical system (OS) by optimization according to the invention will now be described.

The method comprises a providing step, i, in which a set of optical system parameters (OSP) is provided so as to define a starting optical system (SOS). Each optical system parameter (OSP) is set up at a starting value.

The method further comprises a criteria defining step, ii, in which a plurality of criteria ($C_1, \ldots, C_m$) is defined. Then, during a criteria associating step, iii, at least one cost function ($CF_k$) is associated to each criterion ($C_k$). Thus, considering a set of m criteria ($C_1, \ldots, C_m$), m cost functions ($CF_1, \ldots, CF_m$) are associated.

The method further comprises a global cost function defining step, iv, in which a plurality of global cost functions ($GCF_1, \ldots, GCF_{ND}$) is defined by associating to each global cost function ($GCF_p$) at least one cost function ($CF_k$). Each global cost function ($GCF_p$) is associated to a specific discipline ($\Delta_p$). In other words, the m cost functions ($CF_2, \ldots, CF_m$) are grouped into ND disciplines ($\Delta_1, \ldots, \Delta_{ND}$). For each discipline $\Delta_p$, the associated specific global cost function ($GCF_p$) comprises $n_p$ cost functions so that $n_1+n_2+\ldots+n_{ND}=m$.

Each global cost function ($GCF_p$) associated to a specific discipline ($\Delta_p$) is equal to a real function of the $n_p$ cost functions ($CF_k$). The real function can be any function, for example but not limited to, a:

mean function, such as:

$$GCF_p(OSP) = \frac{1}{n_p} \sum_{k=1}^{n_p} CF_k(OSP); \text{ or}$$

minimum function; or
maximum function; or
$L_2$-norm function;

Any other known function from the skilled in the art can be used.

The method further comprises a vector of variable parameters defining step, v, in which a vector of variable parameters ($X_p$) is defined for each global cost function ($GCF_p$) by selecting for each vector of variable parameters ($X_p$) at least one optical system parameter (OSP). Thus, as it will be explained later, a vector of variable parameters ($X_p$) comprises optical system parameters (OSP) that will be allowed to vary during the optimizing step.

The method further comprises an optimizing step, vi in which the plurality of global cost functions ($GCF_1, \ldots, GCF_{ND}$) is optimized by modifying the value of the optical system parameters (OSP) of the vectors of variable parameters ($X_1, \ldots, X_{ND}$) so as to obtain an intermediate optical system (IOS). In other words, the optimizing step consists of solving the ND optimization problems $$\min_{X_p} GCF_p(X_P).$$

The optimizing step is then repeated until equilibrium is reached so as to finally obtain an optical system (OS) (step vii).

The optimization step can be done by using, for example, a multi-criteria method.

Figure 1B:
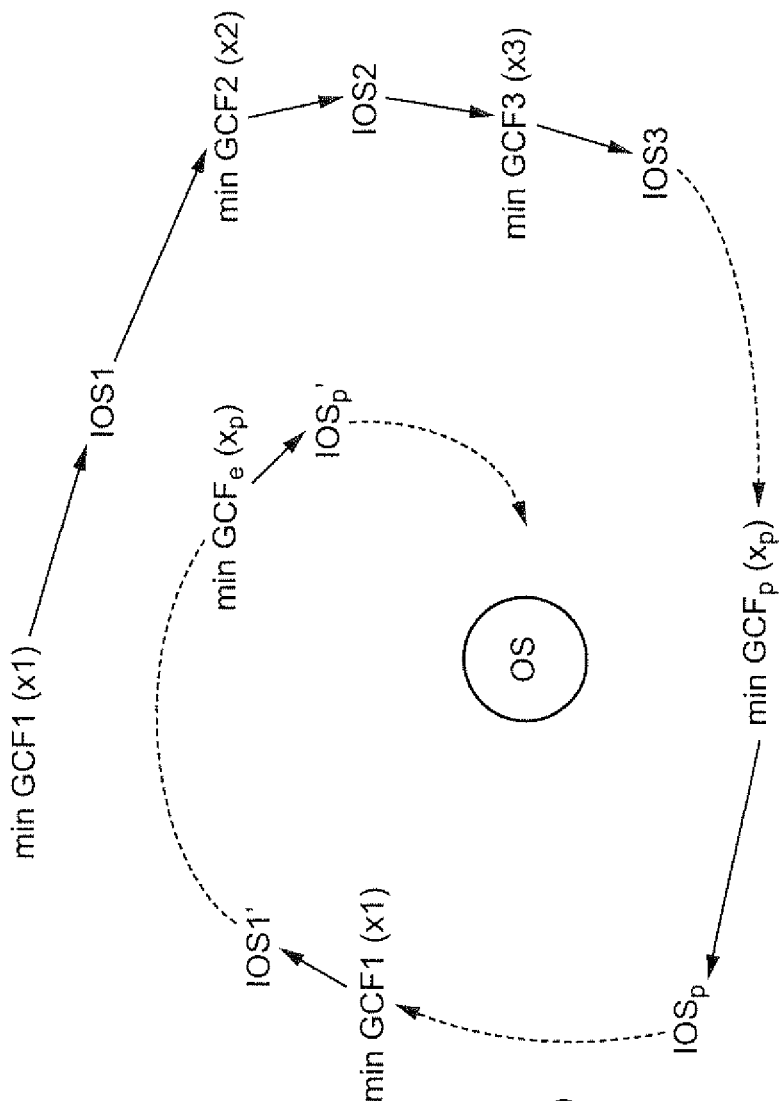

In an alternative non limiting embodiment, as illustrated in FIG. 1b, during each optimizing step, each global cost functions ($GCF_1, \ldots, GCF_{ND}$) can be, for example, alternatively optimized so as to obtain after each optimizing step a new intermediate optical system (IOS1, IOS2, IOS3 . . . ). In other words, during each optimizing step, only one global cost function ($GCF_p$) is minimized at a time. The optimizing steps are then repeated until equilibrium is reached so as to finally obtain an optical system (OS).

To better illustrate the invention, a method of calculating by optimization an optical system which is a single vision lens of −6 diopters (for myopic person) will now be described.

In this example, the optical designer aims at optimizing the lens by minimizing the variation of the magnification in central vision (described by the standard deviation) and by minimizing the optical cost function corresponding to power and astigmatism criteria in central vision over an evaluation domain corresponding to a total angular cone of gaze direction of 70°.

Two disciplines are defined, a first discipline and a second discipline.

The first discipline gathers together both criteria Power $C_1$ and Astigmatism $C_2$ in central vision. The global cost function associated to this discipline is $GCF_1$.

Target values are associated to the evaluation domain $D^j$ for both criteria $C_1$ and $C_2$. $T^j{}_1$ refers to the target value associated to the evaluation domain for $C_1$. $T^j{}_1$ is equal to −6 diopters for each gaze direction $D^j$. $T^j{}_2$ refers to the target value associated to evaluation domain for $C_2$. $T^j{}_2$ is equal to zero for each gaze direction $D^j$.

For each gaze direction $D^j$, the residual of power $\Delta P^j$ and the residual of astigmatism $\Delta A^j$ are calculated:

$$\Delta P^j(D^j, OSP) = H_1(D^j, OSP) - T^j{}_1$$

$$\Delta A^j(D^j, OSP) = H_2(D^j, OSP) - T^j{}_2$$

$H_1$ is the evaluation function which associates to the each gaze direction $D^j$ and considering the optical system parameters (OSP) a power value in central vision.

$H_2$ is the evaluation function which associates to the each gaze direction $D^j$ and considering the optical system parameters (OSP) an astigmatism value in central vision The cost function $CF_1$ associated to $C_1$ is defined by:

$$CF_1 = \sum_{j=1}^{N} [\Delta P^j(D^j, OSP)]^2 \text{ with } N = 70$$

The cost function $CF_2$ associated to $C_2$ is defined by:

$$CF_2 = \sum_{j=1}^{N} [\Delta A^j(D^j, OSP)]^2 \text{ with } N = 70$$

The global cost function $GCF_1$ associated to the first discipline is:

$$GCF_1 = CF_1 + CF_2$$

The second discipline is represented by the standard deviation of the magnification $C_3$ in central vision. The global cost function associated to this discipline is $GCF_2$.

$$GCF_2 = \frac{1}{N-1} \sum_{j=1}^{N} \left[ H_3(D^j, OSP) - \frac{1}{N} \sum_{j=1}^{N} H_3(D^j, OSP) \right]^2,$$

with N=70 wherein $H_3$ is the evaluation function which associates to the each gaze direction $D^j$ and considering the optical system parameters (OSP) a magnification value in central vision.

All optical system parameters describing the back surface of the optical system are considered as variables and are associated to $GCF_1$. $X_1$ represents the vector of said variable parameters.

All optical system parameters describing the front surface of the optical system are considered as variable and are associated to $GCF_2$. $X_2$ represents the vector of said variable parameters.

Until the Nash equilibrium is reached, $GCF_1(X_1)$ and $GCF_2(X_2)$ as explain in FIG. 1B are optimized alternatively.

At the equilibrium, the global cost functions are both minimized:

GCF1(X1)=75.08

GCF2(X2)=0.010

To compare, a traditional lens obtained by a standard optimization where only astigmatism and power criteria are optimized and only one surface is varying lead to a final optical global cost function equal to 65.01. The standard deviation of the magnification in central vision is then equal to 0.021.

This example highlights one of the advantages of the method since criteria from different types are well-optimized. Indeed, the standard deviation of the magnification is optimized besides power and astigmatism criteria. Moreover, the gathering of criteria into different disciplines allows managing criteria which have different orders of size and allows defining different variables among the optical system parameters for each discipline.

Figure 2:
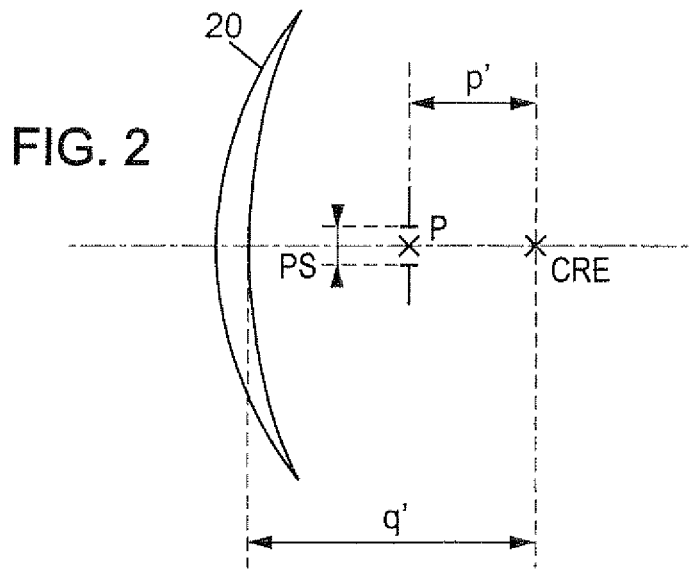
FIG. 2 shows a schematic view of a lens plus eye system.

FIG. 2 illustrates a schematic view of a lens-plus-eye system. Referring to FIG. 2, an eye position can be defined by the center of rotation of the eye CRE and the entrance pupil central point P. PS is the pupil size (not drawn to scale). The distance q' between the CRE and the lens 20 is generally, but not limited to, set to 25.5 mm, and p' defines the position of the eye entrance pupil with respect to the CRE.

Figure 3:
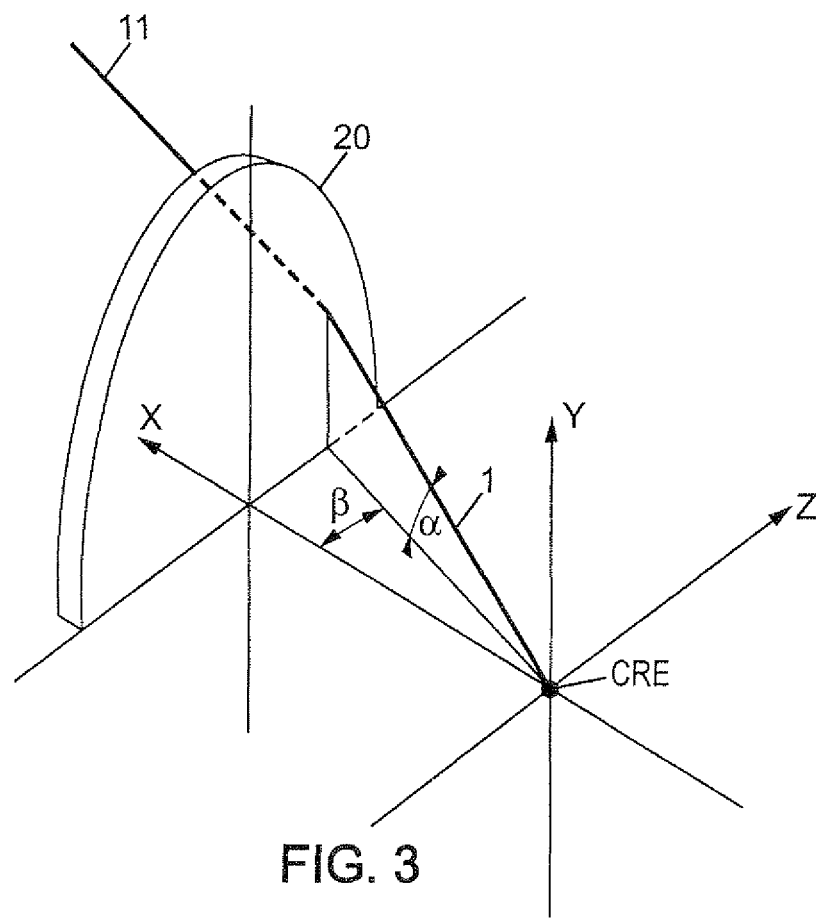
FIG. 3 shows a ray tracing from the center of rotation of the eye.

FIG. 3 illustrates a model for central vision in the purpose of assessing a criterion in a central vision situation by ray tracing. In a central vision situation, the eye rotates about its center of rotation as well as the entrance pupil of the eye. A gaze direction is defined by two angles (α,β) measured with regard to reference axes R=(X, Y, Z) centered on the CRE. For assessing a central vision criterion in a gaze direction (α,β), a gaze ray 1 is built from the CRE in the gaze direction (α,β). 11 is the incident ray after passing through the lens 20.

Figure 4:
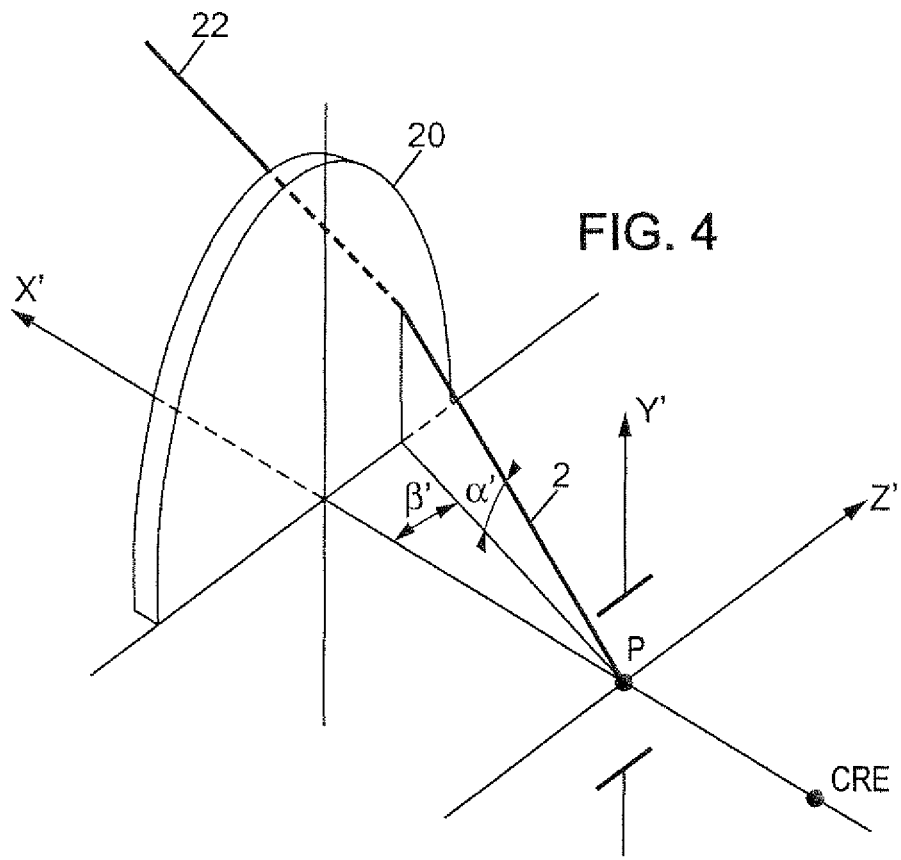
FIG. 4 shows a ray tracing from the center of the eye entrance pupil.

FIG. 4 illustrates a model for peripheral vision in the purpose of assessing a criterion in a peripheral vision situation through ray tracing. In a peripheral vision situation, a gaze direction (α,β) (not represented here) is fixed, and an object is viewed in a peripheral ray direction different from the gaze direction. A peripheral ray direction is defined by two angles (α',β') measured with regard to reference axes R'=(X', Y', Z') centered on the eye entrance pupil and moving along the gaze direction axis given by the fixed direction (α,β) and represented by axis X' on FIG. 4. For assessing a peripheral vision criterion in a peripheral ray direction (α',β'), a peripheral ray 2 is built from the center of the pupil P in a peripheral ray direction (α',β'). 22 is the incident ray after passing through the lens 20.

According to the gaze ray 1 (in central vision) or to the peripheral ray 2 (in peripheral vision), the ray-tracing software computes the corresponding incident ray, alternatively under reference 11 and 22 on FIGS. 3 and 4. Then, an object point is chosen on the ray in the object space and from this object a pencil of rays is built to calculate the final image. Ray tracing enables then to compute the selected criteria.

FIGS. 5 to 13 are now illustrating criterion evaluation method of criteria according to the present invention.

Figure 5:
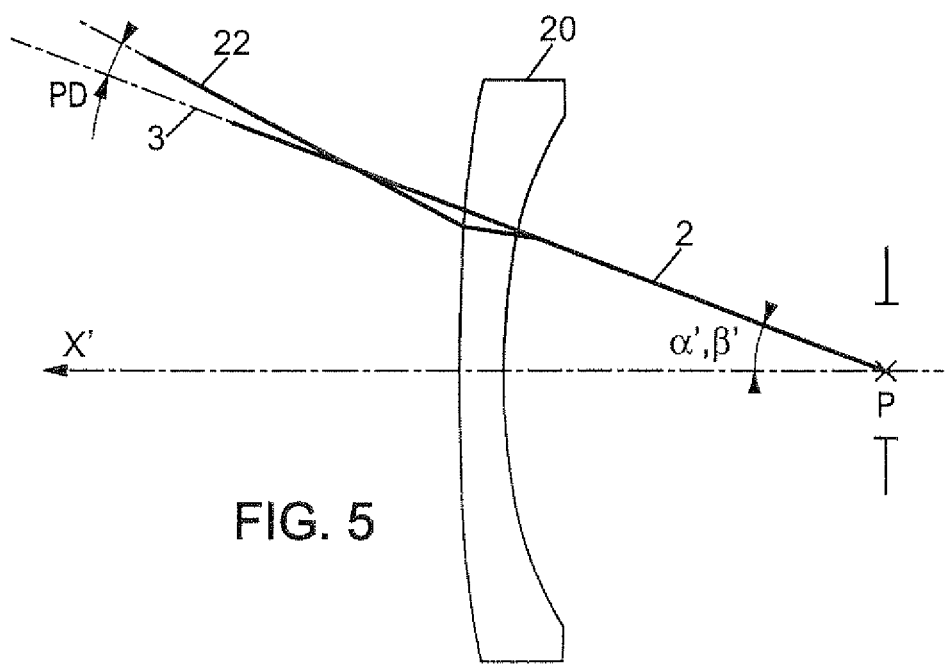
FIG. 5 illustrates prismatic deviation in peripheral vision.

FIG. 5 illustrates ray tracing for estimating prismatic deviation PD in peripheral vision. Prismatic deviation in peripheral vision is estimated through ray tracing of a peripheral ray associated to a peripheral ray direction (α',β') given with regard to reference axes centered on the center of the entrance pupil and moving along the gaze direction, as discussed hereinabove. A ray issued from the center of the entrance pupil in peripheral ray direction (α',β') with the gaze direction axis X' is traced. Incident ray 22 corresponding to ray 2 is then built. Prismatic deviation represents the angle between incident ray 22 and a virtual ray 3 issued from the center of the pupil in the direction of ray 2 and not deviated by the prism of lens 20.

Figure 6:
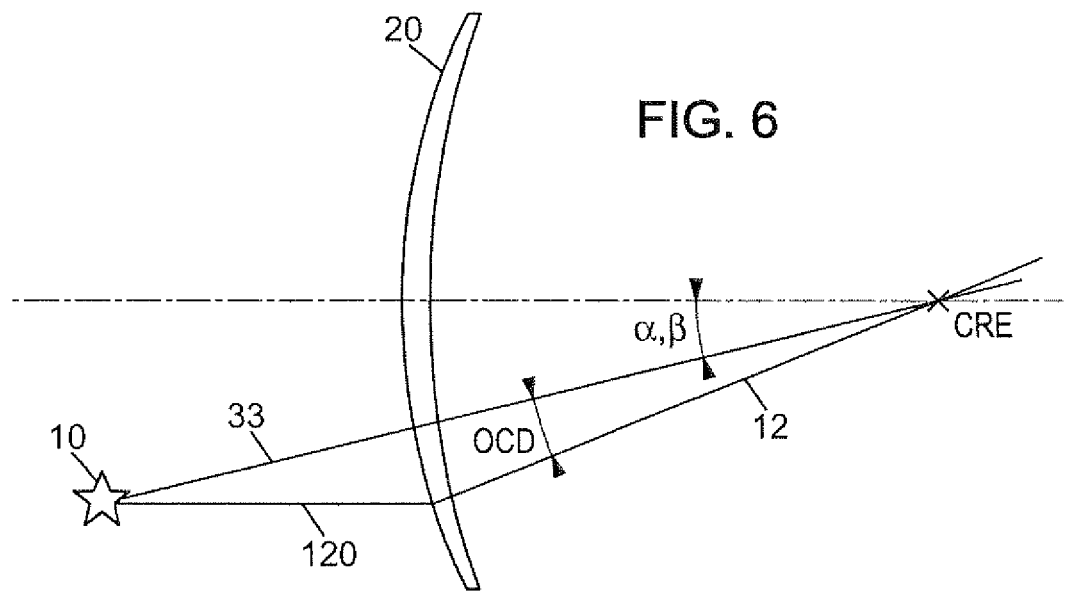
FIG. 6 illustrates ocular deviation.

FIG. 6 describes ocular deviation OCD. It shows a first ray 33 coming from an object 10 when no lens is placed in its path to the CRE, and a second ray 120 coming from the same object whose path is modified by the addition of a lens 20. Ray 12 corresponds to ray 120 in the image space after passing through the lens 20. The ocular deviation OCD in a direction (α,β) is estimated in central vision and is defined as the angle between:
the direction of the eye targeting an object without lens (represented by ray 33) and
the direction of the eye targeting the same object when said lens is placed in front of the viewer eye
(represented by ray 12).

Figure 7:
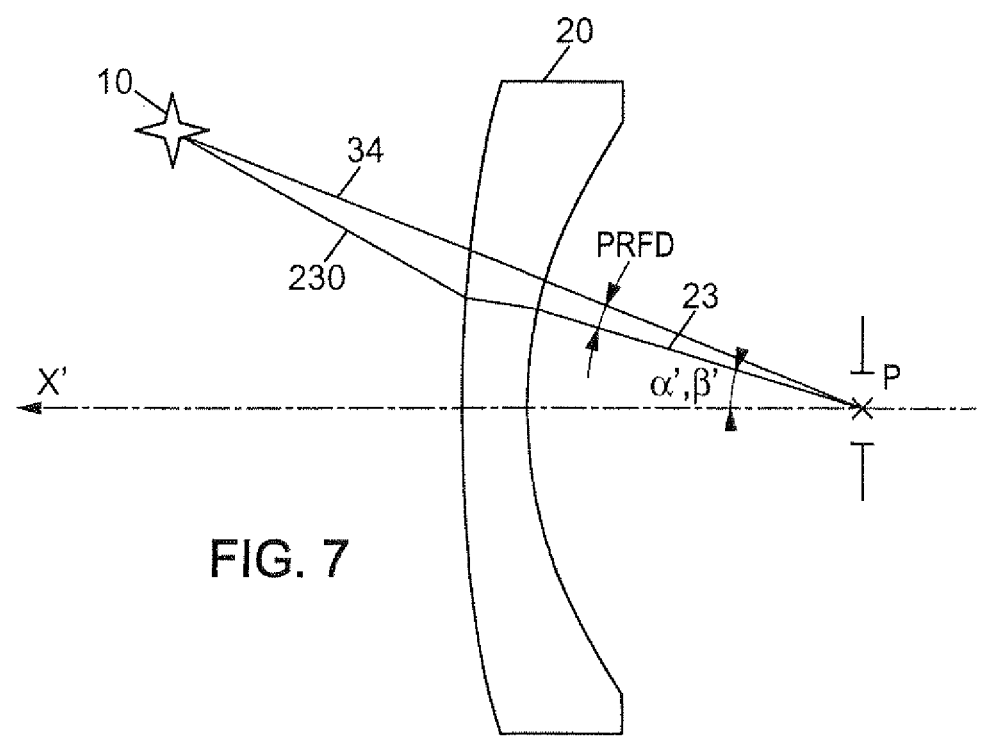
FIG. 7 illustrates pupil ray field deviation.

FIG. 7 illustrates pupil ray field deviation PRFD, it shows a first ray 34 coming from an object 10 located in the peripheral field of view when no lens is placed in its path to the eye entrance pupil, and a second incident ray 230 coming from the same object whose path is modified by the introduction of a lens 20. Ray 23 corresponds in the image field to incident ray 230.

Pupil field ray deviation PRFD is estimated in peripheral vision and is defined as the angle, measured in the image space, between
a straight ray 34 coming from an object localised in the peripheral field of view of an eye and entering the center of the pupil, and
a ray 23 coming from the same object and entering the center of the pupil when said lens is placed on the eyes of the wearer.

Figure 8:
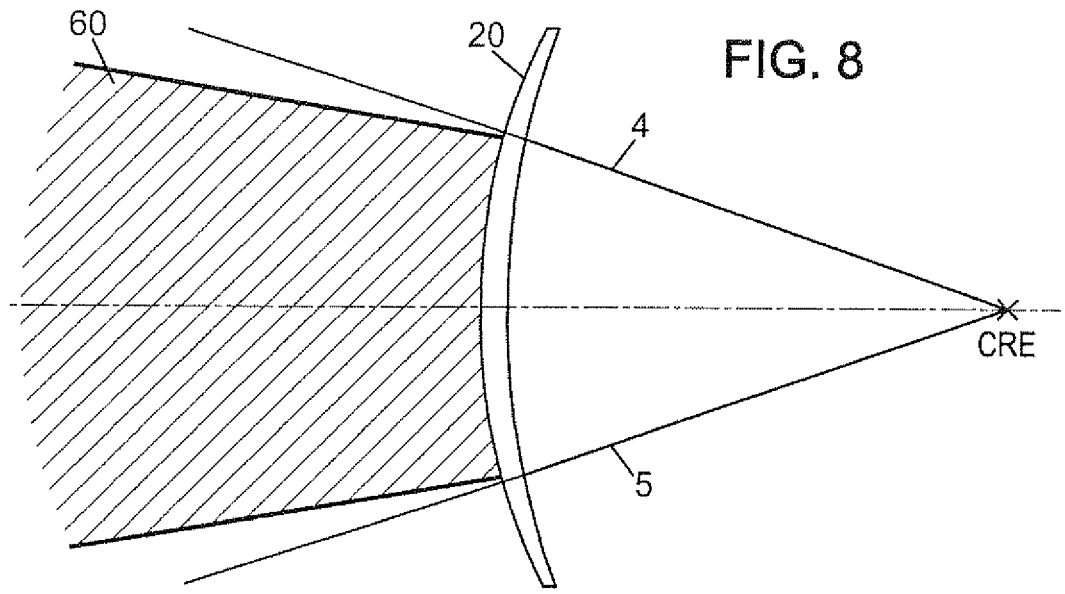
FIG. 8 illustrates object visual field in central vision.

FIG. 8 illustrates object visual field in central vision in a plane and for two arbitrarily chosen rays 4 and 5 issued from the CRE. The object visual field represents the portion of space that the eye can observe scanning an angular portion of the lens determined by ray and ray 5 in the object space. The hatched part 60 represents the object visual field in central vision.

Figure 9:
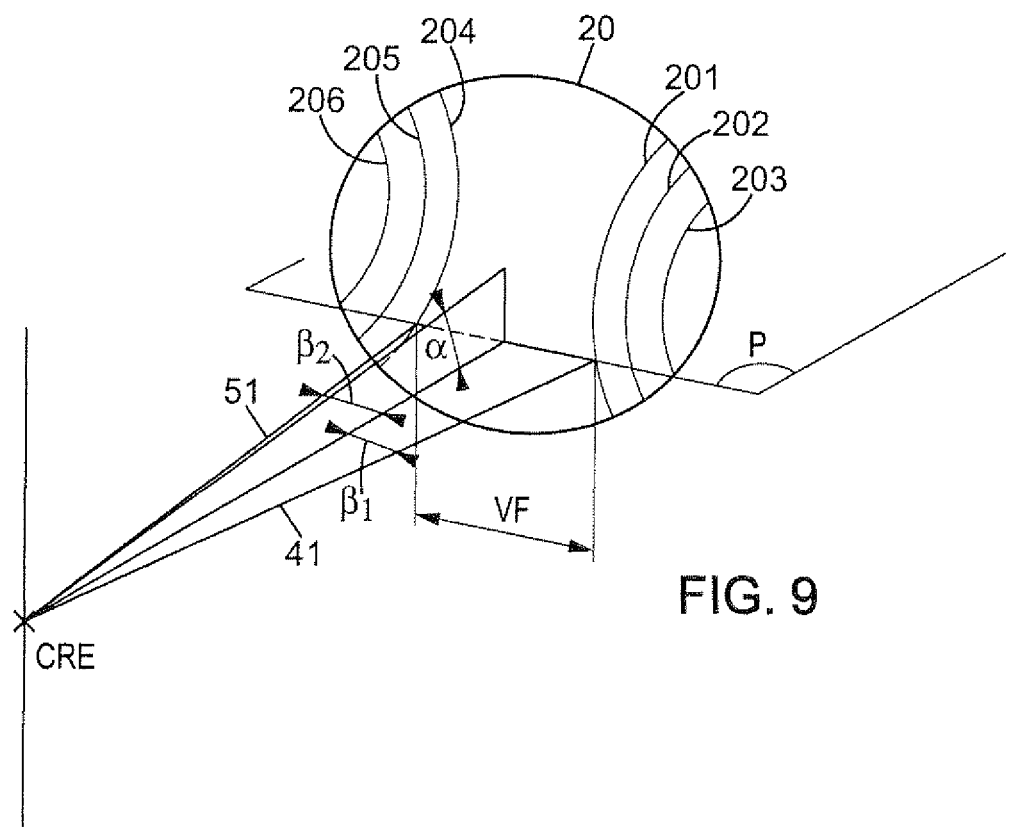
FIG. 9 illustrates horizontal object visual field.

FIG. 9 illustrates an example of visual field VF in central vision for two rays 41 and 51 issued from the CRE. The lens 20 is represented as a surface with isoastigmatism lines 201-206. Rays 41 and 51 are defined as the intersection between a predetermined horizontal axis given by a direction α and two predetermined isoastigmatism lines 201 and 204. These intersections enable to trace ray 41 along direction (α,β1) and ray 51 along direction (α,β2). The object visual field VF in central vision is a function of prismatic deviation and can be mathematically expressed for two rays as:

$$VF(\alpha) = |\beta1 + Dp\_H(\alpha,\beta1)| + |\beta2 \pm Dp\_H(\alpha,\beta2)|$$

Dp_H(α,β1) represents horizontal prismatic deviation in the gaze direction (α,β1). Horizontal prismatic deviation is the component of the prismatic deviation in a horizontal plane referenced P on FIG. 8.

Dp_H(α,β2) represents horizontal prismatic deviation in the gaze direction (α,β2).

Figure 10:
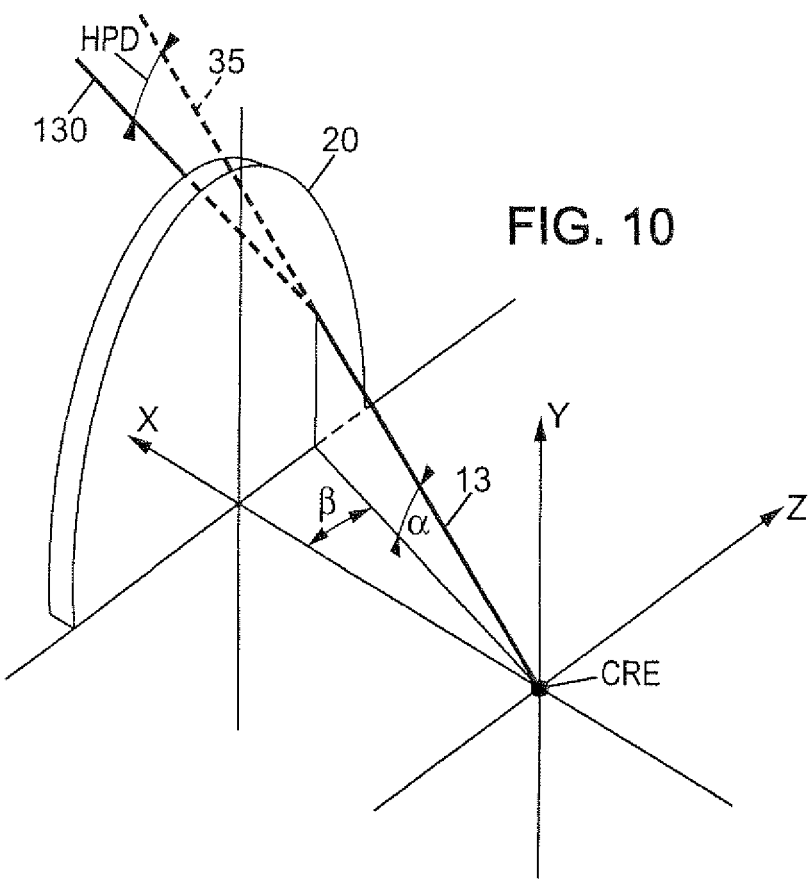
FIG. 10 illustrates horizontal prismatic deviation in central vision.

FIG. 10 illustrates horizontal prismatic deviation HPD in central vision. Prismatic deviation is defined as the angular difference between ray 130 and ray 35. Ray 130 is the image of the ray 13 in the object space. Ray 13 is issued from the eye rotation center according to direction (α,β) in the fixed reference axes (X, Y, Z) centered on the eye rotation center as represented on FIG. 10. Ray 35 is a virtual ray issued from the eye rotation center according to direction (α,β) and not deviated by the prism of the lens. Horizontal prismatic deviation HPD is the component of the prismatic deviation in the plane (XOZ) and can be calculated through:

$$HPD = \left( \text{Arcsin}\left( \left( \frac{V_{ini}^h \wedge V_{fin}^h}{\|V_{ini}^h\| \|V_{fin}^h\|} \right) \cdot \vec{y} \right) \right),$$

wherein $V^h = V - \vec{y}(V \cdot \vec{y})$, and $V_{ini}$ and $V_{fin}$ are direction vectors of alternatively ray 13 and 130.

Figure 11:
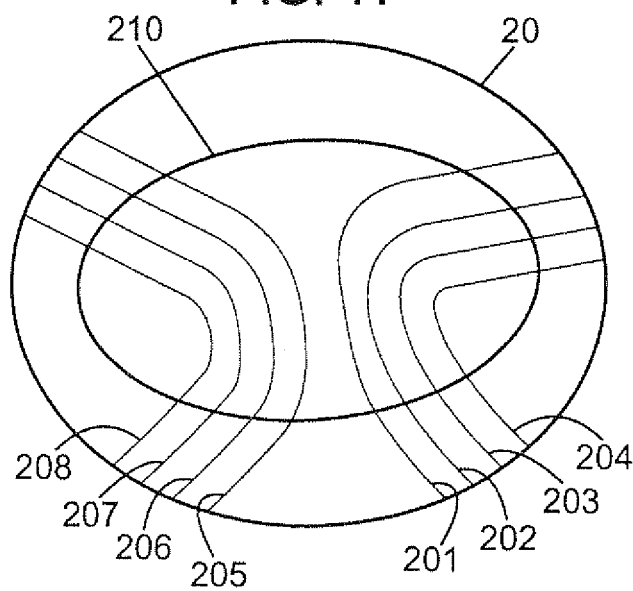
FIG. 11 illustrates total object visual field.

FIG. 11 illustrates another embodiment of object visual field in central vision defined by a set of gaze directions representing the spectacle frame shape 210. The lens 20 is represented as a surface with isoastigmatism lines 201-208. For each (αi,βi) of said gaze directions, we define Pi the plane containing:
the vector defined by the gaze direction (αi,βi)
the vector defined by the gaze direction (0,0)
the Centre of Rotation of the Eye.
We calculate the prismatic deviation projected on Pi for the gaze direction given by (α,β)=(0,0): Dp_i(0,0).

We calculate the prismatic deviation projected on Pi for the gaze direction given by (αi,βi): Dp_i(αi,βi).

This visual field is named total object visual field and can be mathematically expressed as $$VF = \sum_i |Dp\_i(0, 0) + \beta i + Dp\_i(\alpha i, \beta i)|$$

Where:

Dp_i(αi, βi) represents the prismatic deviation in the gaze direction (αi,βi) projected on the plane Pi.

Figure 12:
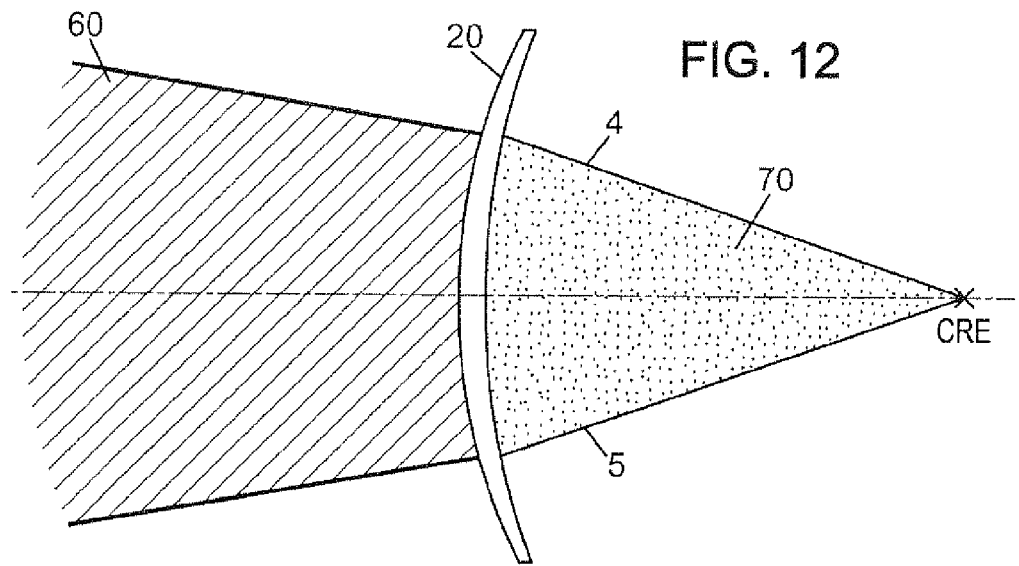
FIG. 12 illustrates image visual field in central vision.

FIG. 12 illustrates image visual field in central vision, rays 4 and 5 are used to define the object visual field in central vision and dotted part 70 represents the image visual field in central vision considering an object visual field in central vision represented in hatched part 60.

Figure 13:
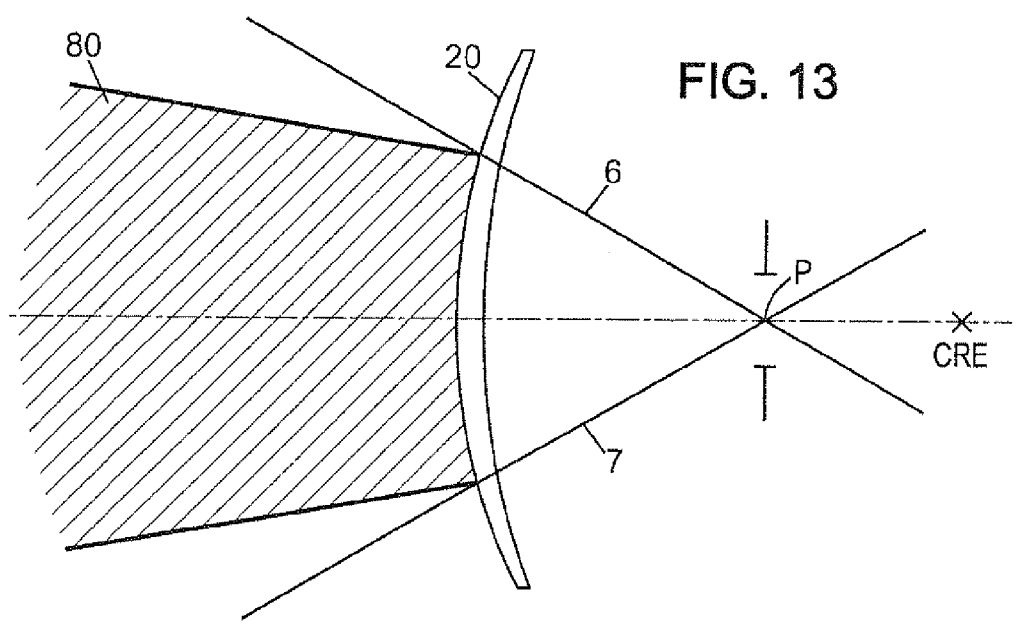
FIG. 13 illustrates object visual field in peripheral vision.

FIG. 13 illustrates object visual field in peripheral vision in a plane and for two arbitrarily chosen rays 6 and 7 issued from the entrance pupil of the eye P. The hatched part 80 represents the object visual field in peripheral vision.

Figure 14:
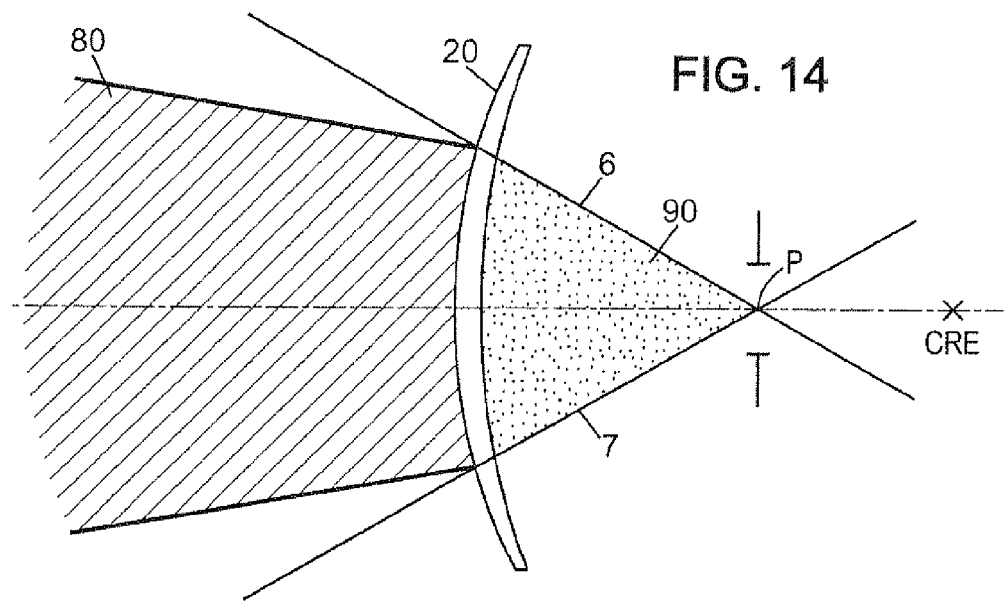
FIG. 14 illustrates image visual field in peripheral vision.

FIG. 14 illustrates image visual field in peripheral vision, rays 6 and 7 are used to define the object visual field in peripheral vision 80 and dotted part 90 represents the image visual field in peripheral vision considering an object visual field in peripheral vision represented in hatched part 80.

Figure 15:
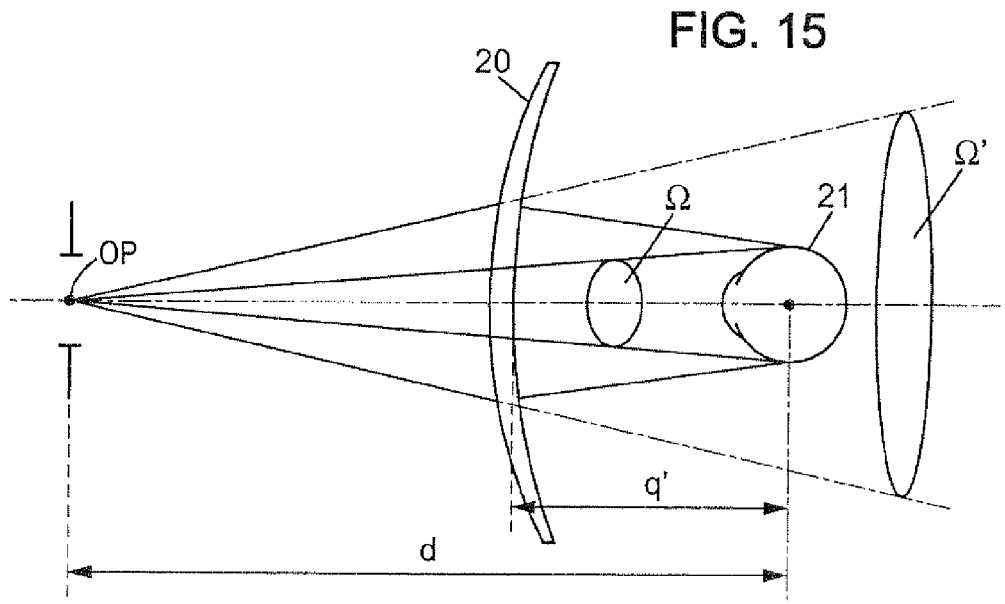
FIG. 15 illustrates the magnification of the eye.

FIG. 15 illustrates the magnification of the eye of a wearer. Ω and Ω' are alternately the solid angles under which an observer sees the eye of a wearer with and without a lens 20. The observer is located at a distance d of the wearer which eye is referred as 21, the center of the observer entrance pupil is referred as OP and the vertex distance between the wearer's eye 21 and the lens 20 is referred as q'. For example, the distance d can be for example equal to one meter.

FIGS. 16a and b illustrate temple shift TS. Temple shift is due to the prismatic deviation induced by a lens 20 when a wearer is seen by an observer. OP is the pupil center point of an observer looking the wearer's head 25. The wearer's eye is referred as 21, the wearer's nose is referred as 27, the wearer's temple is referred as 26. The wearer is wearing spectacle lenses. Temple shift is defined as an angle TS between a ray 100 stemmed from the temple 26 when the observer is looking the temple of the wearer without the lens and a ray 101 stemmed from the temple 26 when the observer is looking the temple of the wearer through the lens 20. For example, the distance between the wearer and the observer can be equal to one meter.

Non limiting embodiments of cost functions are now described to better illustrate the invention.

Embodiments of cost functions are described firstly for a local criterion $C_k$ and then for a global criterion $C_k$.

For a local criterion $C_k$, following steps are implemented:
define an evaluation zone $D_k$ associated to a criterion $C_k$.
The evaluation zone comprises one or several evaluation domain $D^i_k$, (i∈[1 ... $M_k$], $M_k$ integer superior or equal to 1 represents the number of evaluation domains associated to a criterion) said evaluation domain being defined as at least one gaze direction (α,β) if said criterion belongs to the central vision criteria group, or at least one peripheral ray direction (α',β') if said criterion belongs to the peripheral vision criteria group;
define an evaluation function $H_k$: for a pair {$C_k$, $D_k$} comprising a criterion $C_k$ and an evaluation zone $D_k$, an evaluation function $H_k$ associates to one evaluation domain $D^i_k$ of $D_k$ a numerical criterion value $H_k$ ($D^i_k$, OSP) for an optical system (OS) defined by its optical system parameters (OSP);

giving a triplet {$C_k$, $D_k$, $H_k$} comprising a criterion $C_k$, an evaluation zone $D_k$, an evaluation function $H_k$ and optical system parameters OSP, define a cost function $CF_k$ (OSP). The cost function $CF_k$ associates a numerical value to the criterion $C_k$ on the zone $D_k$.

A given criterion $C_k$ can be used several times with eventually different evaluation zones; for example $CF_1$ and $CF_2$ can be associated to this given criterion $C_k$.

Target values can be associated to the evaluation domains. Target values can be determined by the optical designer by several ways:

by using a "target lens": for a selected criterion, target values are computed from the target lens and are further used as target values.

by using a database where target values are predetermined for a criterion and a corresponding set of evaluation domains.

by using an analytic function.

Given criterion values and corresponding set of targets, a cost function can be mathematically defined by:

$$CF_k(OSP) = \sum_{i=1}^{Mk} w^i_k * (H_k(D^i_k, OSP) - T^i_k)^2,$$

wherein $T^i_k$ is a target value associated to an evaluation domain $D^i_k$ and $w^i_k$ are predetermined weights.

Advantageously target values do not need to be predetermined.

For example, a cost function can be defined as:
a maximal value over the evaluation zone $D_k$ associated to criterion $C_k$:

$$CF_k(OSP) = \max_{i=1 ... Mk} \left(H_k(D^i_k, OSP)^2\right), \text{ or}$$

$$CF_k(OSP) = \left[\max_{i=1 ... Mk} H_k(D^i_k, OSP)\right]^2,$$

wherein $$\max_i$$

returns the maximum value of $H_k$ over the evaluation domains of the evaluation zone $D_k$ associated to $C_k$.

a weighted sum:

$$CF_k(OSP) = \left[\sum_{i=1}^{Mk} w^i_k * H_k(D^i_k, OSP)\right]^2,$$

wherein $W^i_k$ (are predetermined weights.

a mean value for all the evaluation domain $D^i_k$ of the evaluation function $H_k$:

$$CF_k(OSP) = \frac{1}{M_k} \sum_{i=1}^{M_k} H_k(D^i_k, OSP)$$

For a global $C_k$, following steps are implemented:

define an evaluation function $H_k$: for a criterion $C_k$, an evaluation function $H_k$ associates a numerical criterion value $H_k(OSP)$ for an optical system (OS) defined by its optical system parameters (OSP);

giving an evaluation function $H_k$ and optical system parameters OSP, define an cost function $CF_k(OSP)$. The cost function $CF_k$ associates a numerical value to the criterion $C_k$.

Target values can be associated to the criterion. Target values are determined by the optical designer by several ways:

ii. By using a "target lens": For a selected criterion, target values are computed from the target lens and are further used as target values;

iii. By using a database where target values are predetermined for a criterion;

iv. By using an analytic function.

Given criterion value and corresponding target, a cost function can be mathematically defined by:

$$CF_k(OSP) = W_k * (H_k(OSP) - T_k)^2,$$

wherein $T_k$ is a target value and $w_k$ is a predetermined weight.

Advantageously, target values do not need to be predetermined.

For example, a cost function can be defined as the evaluation function $H_k$:

$$CF_k(OSP) = H_k(OSP)$$

It can be any other real function as for example $$CF_k(OSP) = (H_k(OSP))^2$$

The present invention provides thus a method for calculating by optimization an optical system which can be used for all kinds of optical lenses, particularly ophthalmic lenses, e.g. single vision (spherical, torical), bi-focal, progressive, aspherical lenses (etc).

The invention has namely been described above with the aid of embodiments directed to optical systems. It has to be stated that those embodiments do not limit the general inventive concept and that the present invention provides a method for calculating by optimization a system for all kinds of technical fields.

The method of the invention is of particular interest when dealing with complex systems. As for an example, the jointly optimization of a wiper and windshield surface is such a complex problem to be solved.

What is claimed is:

1. A method implemented by a computer for calculating an optical system, by optimization, the method comprising:
   i. providing a set of optical system parameters to define a starting system, each optical system parameter being set up at a starting value;
   ii. defining a plurality of criteria;
   iii. associating a cost function for each criterion;
   iv. defining a plurality of global cost functions by associating at least one of the cost functions to each global cost function;
   v. defining a vector of variable parameters associated with each global cost function by selecting at least one of the set of optical system parameters for each vector of variable parameters;
   vi. optimizing the plurality of global cost functions using the computer by modifying at least one of the values of the optical system parameters of the vectors of variable parameters to obtain an intermediate optical system, wherein obtaining the intermediate optical system includes alternatively optimizing each global cost function by minimizing one of the global cost functions at a time to obtain a new intermediate optical system after each optimizing step; and
   vii. repeating step vi. until an equilibrium is reached to obtain the optical system defined by optical system parameters that include surfaces, an index of glasses, and a position of each of the surfaces relative to each other.

2. The method of claim 1, wherein, during step vi., the optimizing the plurality of global cost functions is effected by using a multi-criteria method.

3. The method of claim 1, wherein, during step vi., the optimizing the plurality of global cost functions is effected by using a multi-objective method.

4. The method of claim 1, wherein, during step v., the at least one system optical parameter is selected for only one vector of variable parameters.

5. The method of claim 1, wherein the starting optical system comprises a first and a second optical surface, and wherein, during step v., a first and a second vector of variable parameters are defined, the first vector of variable parameters comprising optical system parameters related to the first optical surface, the second vector of variable parameters comprising optical system parameters related to the second optical surface.

6. The method of claim 1, wherein at least one global cost function is defined by associating one or more cost functions associated with optical criteria selected from one or more of power in central vision, astigmatism in central vision, high order aberration in central vision, acuity in central vision, power in peripheral vision, astigmatism in peripheral vision, and high order aberration in peripheral vision.

7. The method of claim 1, wherein at least one global cost function is defined by associating one or more cost functions associated with optical criteria selected from one or more of prismatic deviation in central vision, ocular deviation, object visual field in central vision, image visual field in central vision, magnification in central vision pupil field ray deviation, object visual field in peripheral vision, image visual field in peripheral vision, prismatic deviation in peripheral vision, magnification in peripheral vision, magnification of the eye, and temple shift.

8. The method of claim 1, wherein at least one global cost function is defined by associating one or more cost functions to a geometrical criteria.

9. The method of claim 1, wherein, during step vi. and step vii., each of the plurality of global cost functions are optimized until an equilibrium is reached.

10. The method of claim 1, further comprising: manufacturing the calculated optical system.

11. One or more non-transitory computer-readable storage media encoding computer-executable instructions for executing on a computer system a computer process for calculating an optical system, by optimization, the computer process comprising:

providing a set of optical system parameters to define a starting optical system, each optical system parameter being set up at a starting value;

defining a plurality of criteria;

associating a cost function for each criterion;

defining a plurality of global cost functions by associating at least one of the cost functions to each global cost function;

defining a vector of variable parameters associated with each global cost function by selecting at least one of the set of optical system parameters for each vector of variable parameters;

optimizing the plurality of global cost functions by modifying at least one of the values of the optical system parameters of the vectors of variable parameters to obtain an intermediate optical system, each global cost function being alternatively optimized by minimizing one of the plurality of global cost functions at a time to obtain a new intermediate optical system; and repeating the optimizing operation until an equilibrium is reached to obtain the optical system defined by optical system parameters that include surfaces, an index of glasses, and a position of each of the surfaces relative to each other.

12. The one or more non-transitory computer-readable media of claim 11, wherein the optimizing the plurality of global cost functions is effected by using a multi-criteria method.

13. The one or more non-transitory computer-readable media of claim 11, wherein the optimizing the plurality of global cost functions is effected by using a multi-objective method.

14. The one or more non-transitory computer-readable media of claim 11, wherein the at least one optical system parameter is selected for only one vector of variable parameters.

15. The one or more non-transitory computer-readable media of claim 11, wherein the starting optical system comprises a first and a second optical surface, and wherein a first and a second vector of variable parameters are defined, the first vector of variable parameters comprising optical system parameters related to the first optical surface, the second vector of variable parameters comprising optical system parameters related to the second optical surface.

16. The one or more non-transitory computer-readable media of claim 11, wherein at least one global cost function is defined by associating one or more cost functions associated with optical criteria selected from one or more of power in central vision, astigmatism in central vision, high order aberration in central vision, acuity in central vision, power in peripheral vision, astigmatism in peripheral vision, and high order aberration in peripheral vision.

17. The one or more non-transitory computer-readable media of claim 11, wherein at least one global cost function is defined by associating one or more cost functions associated with optical criteria selected from one or more of prismatic deviation in central vision, ocular deviation, object visual field in central vision, image visual field in central vision, magnification in central vision pupil field ray deviation, object visual field in peripheral vision, image visual field in peripheral vision, prismatic deviation in peripheral vision, magnification in peripheral vision, magnification of the eye, and temple shift.

* * * * *